April 9, 1968 K. D. BARTLEY ETAL 3,377,080

TELEPHONE BOOTH ASSEMBLY

Filed Jan. 21, 1965 8 Sheets-Sheet 1

INVENTORS K. D. BARTLEY
R. E. PRESCOTT
BY E J Olinder
ATTORNEY

April 9, 1968 K. D. BARTLEY ETAL 3,377,080

TELEPHONE BOOTH ASSEMBLY

Filed Jan. 21, 1965 8 Sheets-Sheet 2

April 9, 1968 K. D. BARTLEY ETAL 3,377,080

TELEPHONE BOOTH ASSEMBLY

Filed Jan. 21, 1965 8 Sheets-Sheet 5

FIG. 7 (B-B)

April 9, 1968 K. D. BARTLEY ETAL 3,377,080
TELEPHONE BOOTH ASSEMBLY
Filed Jan. 21, 1965 8 Sheets-Sheet 8
FIG. 9 (C-C)
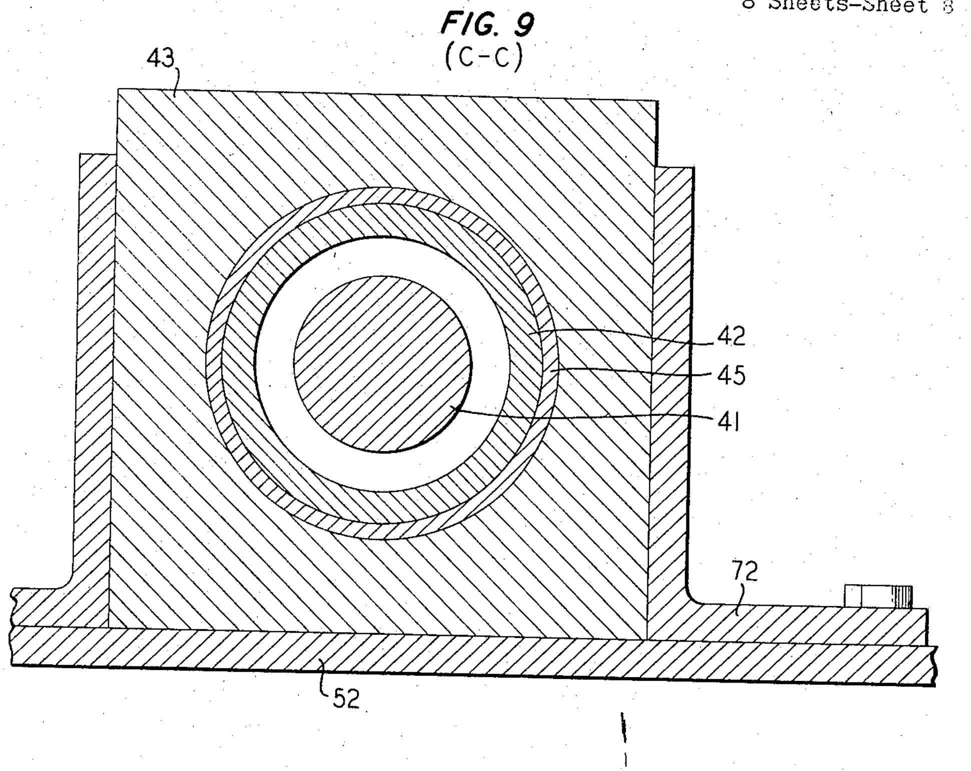
FIG. 12
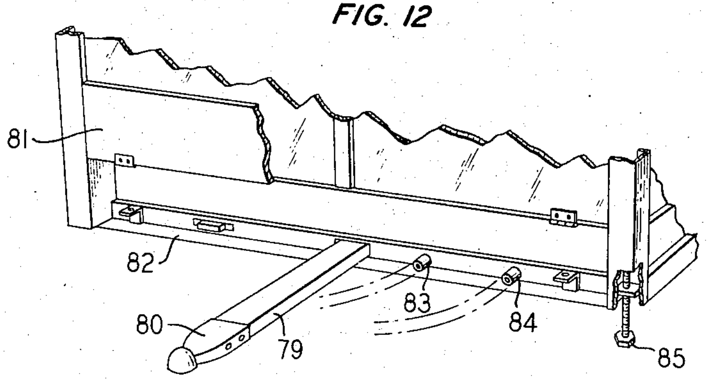
FIG. 13
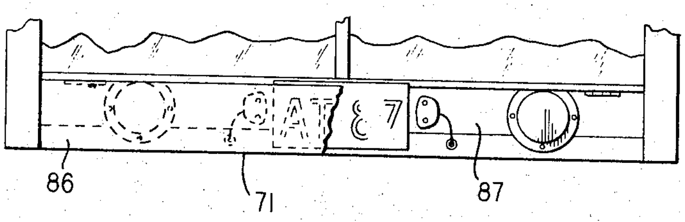

3,377,080
TELEPHONE BOOTH ASSEMBLY

Keith D. Bartley, Indianapolis, Ind., and Robert E. Prescott, Rumson, N.J., assignors to Bell Telephone Laboratories, Incorporated, New York, N.Y., a corporation of New York Filed Jan. 21, 1965, Ser. No. 427,030
18 Claims. (Cl. 280—43.23)

ABSTRACT OF THE DISCLOSURE

A lightweight integral mobile telephoning structure is disclosed featuring several separate telephoning spaces, a central space housing a retractable set of wheels, leveling means, twin roof canopies, a retractable roof mast, a retractable tow bar, telephone directory shelves, ventilating and light equipment.

This invention relates to public telephone pay stations, and specifically to apparatus for providing pay station service speedily and economically.

In response to a growing demand for public coin telephone stations, the numbers of coin telephones and booths, indoor and outdoor alike, have grown considerably in recent years. The great diversity of this demand has given rise to certain problems which are not adequately met by current concepts in telephone booth configuration, installation and flexibility.

A persistent one of these problems relates to serving intermittent, occasional or emergent needs for pay stations as occur, for example, at seasonal resorts, conventions, sporting events, construction sites and disaster scenes, to name just a few. It is always desirable, and frequently essential, that these needs be met speedily. However, the loading, trucking, unloading and installing of an assemblage of telephone booths is time consuming, and requires an inordinate amount of manpower and equipment.

Another serious problem concerns booth installation costs in general but is especially relevant to the non-continuous types of needs. This problem stems from the requirement that booths or other housing structures be sufficiently rigid and secured in place to withstand human traffic and wind forces where present; and to discourage certain acts of vandalism and outright theft. As a consequence, most booths are anchored on site or otherwise permanently affixed in place. The installation and removal costs are substantial, however; and almost invariably include costs of alterations to the premises which, since they rarely belong to the Telephone Company, must be restored to original condition on removal of the booths.

Other instances besides those mentioned call for greater flexibility and mobility in pay telephone service that is not possible with present apparatus. For example, additional stations are occasionally needed to augment temporarily the service of permanent stations. Or, it is sometimes desirable to relocate a group of stations from one point to another nearby point as might occur, for example, at a construction site or a transportation terminal. Moreover, the locations of greatest public need for pay stations are not always correctly identified at the outset; and, accordingly, a means is needed for sampling public demand without necessarily incurring high permanent or semi-permanent installation costs. Merely to place a telephone booth assemblage on wheels or on a trailer, however, does not solve the several problems posed. The added step-up height would make access difficult, and for some, impossible. Furthermore, the trailer appearance would have an adverse effect on the attractiveness of the booth. The latter objection is especially significant since public acceptance and usage of telephone booths is directly related to their attractiveness.

Accordingly, an object of the invention is to simplify the installation and relocation of groupings of public pay stations.

Another object of the invention is to substantially reduce the cost of installing and relocating public pay stations.

A further object of the invention is to render a substantial portion of the telephone pay stations mobile so that intermittent or emergent needs may be met rapidly.

A further object of the invention is to utilize more efficiently telephone pay stations.

These and other objects are accomplished in accordance with the invention by a lightweight, integral structure comprising several separate telephoning areas, a central space housing a retractable set of torsionally suspended wheels, leveling means, twin roof canopies, retractable roof mast, retractable tow bar, directory shelves, ventilating and light equipment and other features.

This unit, in accordance with the invention, combines attractiveness and the usefulness of several telephone stations with the mobility of a trailer, in order to decrease or eliminate installation costs and to provide fast temporary telephone service wherever needed. The unit is sufficiently inexpensive that it may even be left permanently on location indoors or out, either with the trailer wheels retracted or removed for service in another similar booth.

In its preferred embodiment, the invention consists of a unitary rectangular-based structure having a pair of enclosed booth areas at each end and a pair of recessed telephoning areas on either side, each booth and area being relatively private and having a coin telephone. In accordance with the invention, a central core or space inwardly of the telephoning areas houses utility equipment such as an air conditioner, a generator, a spare tire, telephone cable, power cable, retractable overhead mast and other material. In addition, in the lower portion of the central space the trailer wheels and their retractable suspension are secured. The wheels and suspension may be let down or retracted by any convenient means as, for example, a manually operated hydraulic system. When the structure is lowered to ground level, access to the telephoning areas is easy and safe; and the wheels are completely concealed within the inner space. The tow bar is retractable to conceal it when not in use. A hinged panel at one end exposes stop lights, blinker lights and license plate; and further serves as a shield when in its upper position. In each of the four exterior corners, screw-type leveling devices can compensate for uneven mounting surfaces. A service mast that is hinged or retractable brings in from overhead commercial power and telephone cable. Plug-in service connections at ground level are a convenient alternative. Hinged canopies shelter the side areas and store in a flat position at the sides of the structure. Appropriate lights, such as fluorescent tubes, are located at the header section in both sides and ends to illuminate the telephoning areas through translucent ceiling areas and to light a sign identifying the structure, thus calling attention to the structure.

When on location with the wheels and tow bar retracted, the structure bears no resemblance to a trailer. This attribute makes the structure desirable for such areas as hotel lobbies, convention areas and any other application where the trailer feature would detract from its appearance or function. An additional advantage derived from the retractable wheels feature is that the structure may be removed slightly from the ground when in use on location, where conditions require it. Examples of the latter include flooding, extremely uneven terrain, extreme heat, or to facilitate repairs or cleaning. Furthermore, in the event of a flat tire, the wheels can be retracted so that the trailer rests on the ground while the tires are actually slightly above the ground and accordingly may be changed very quickly.

Accordingly, a feature of the invention resides in a unitary structure for portably housing a plurality of telephone coin stations that includes a fully retractable concealable suspension system.

Another feature of the invention relates to a unitary mobile structure having a plurality of relatively accessible outer telephone areas surrounding a central space containing the necessary service equipment and that concealably houses the entire suspension system.

A further feature of the invention relates to a compact mobile structure containing a plurality of relatively private telephoning areas which, when in use, is identifiable only with the service offered and is unrecognizable as a mobile, trailer device.

These and other objects and features of the invention are delineated in the following description of an illustrative embodiment thereof, and in the drawings in which:

FIG. 9 is a sectional view taken along C—C of FIG. 6;

FIG. 12 is a schematic showing the front end of the unit;

FIG. 13 is a schematic showing the rear end; and

Figure 1:
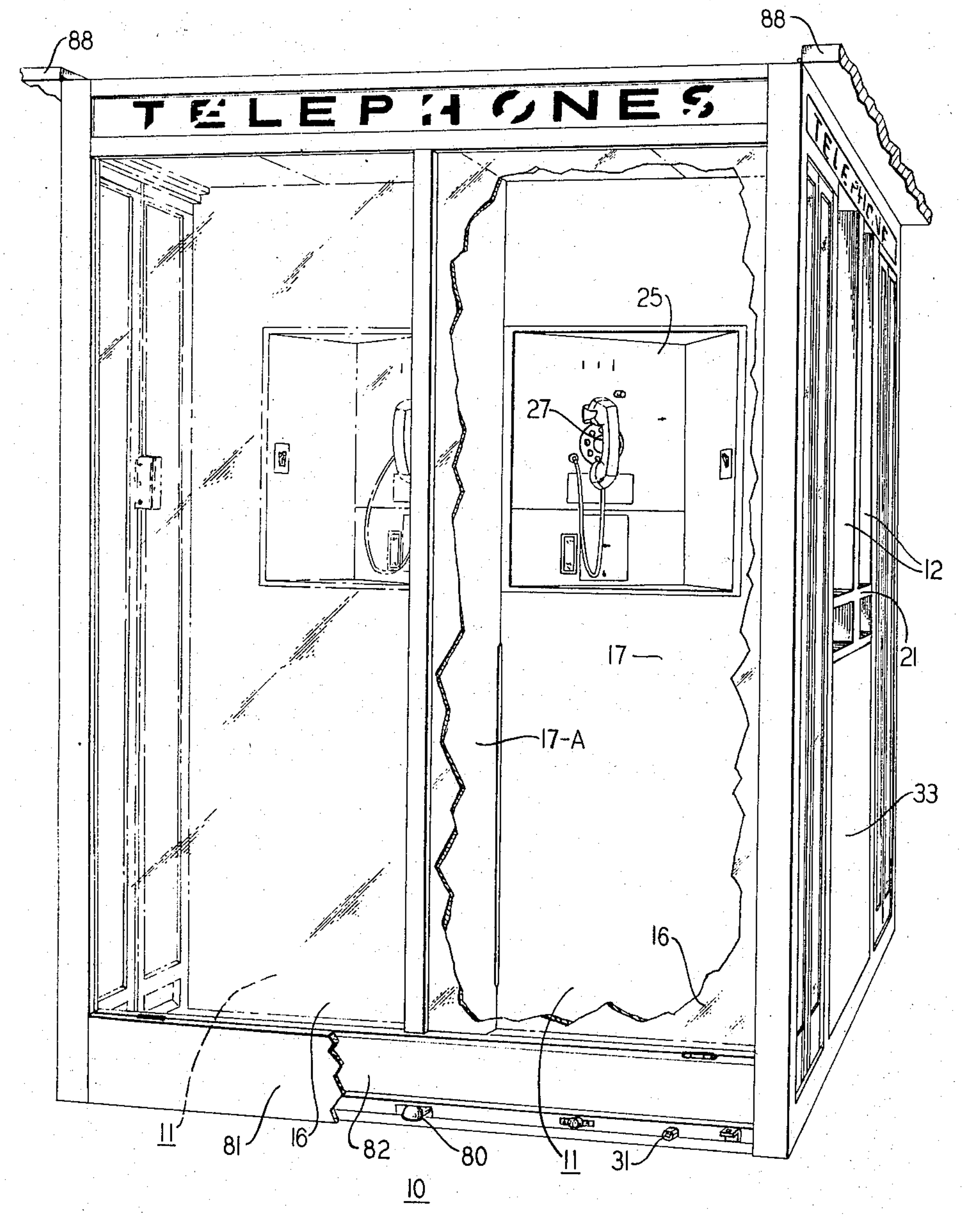
FIG. 1 is a perspective view showing in partial cutaway two end booths.
Figure 2:
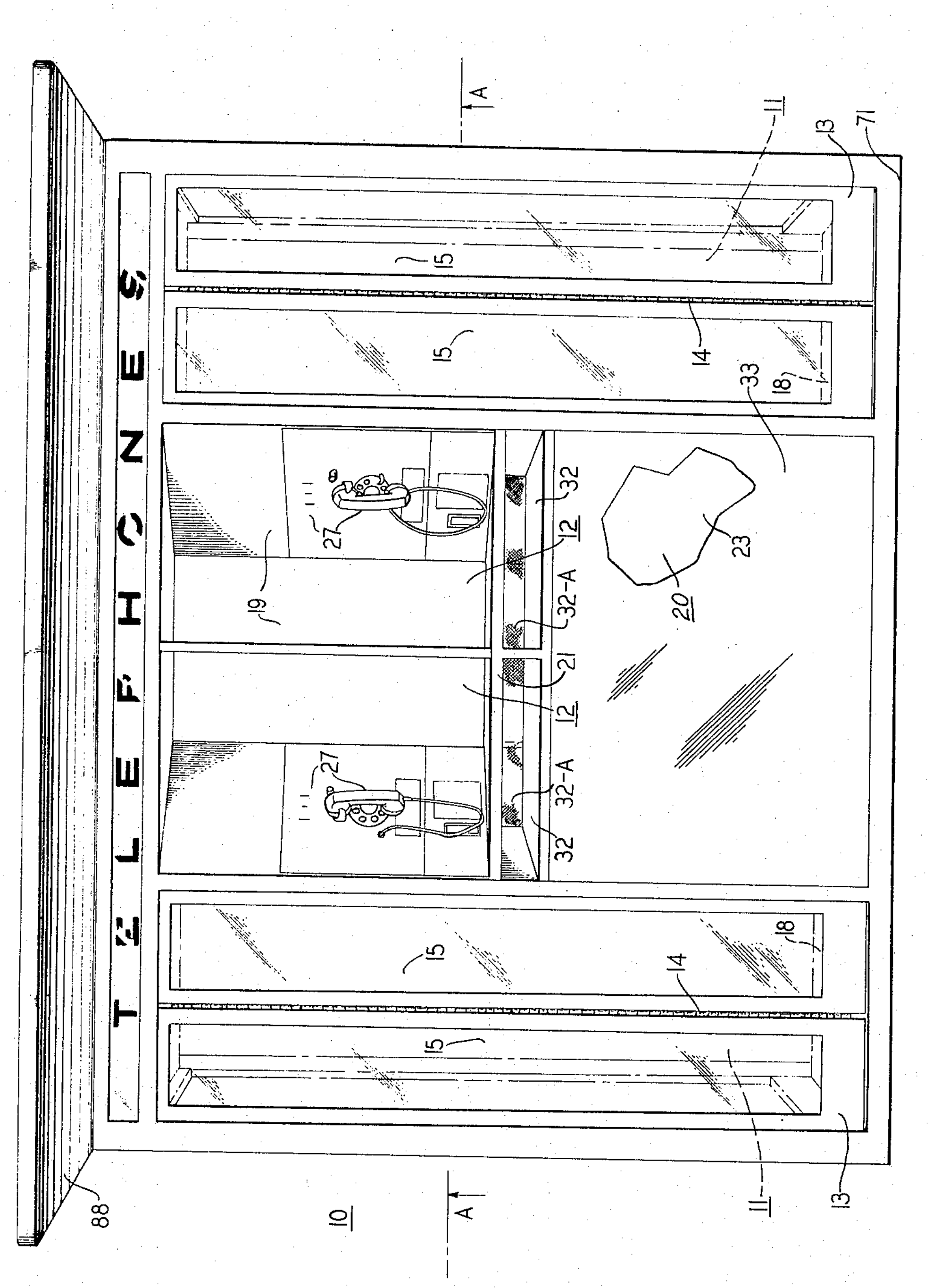
FIG. 2 is a side perspective view showing end booths and one pair of telephoning recesses.
Figure 3:
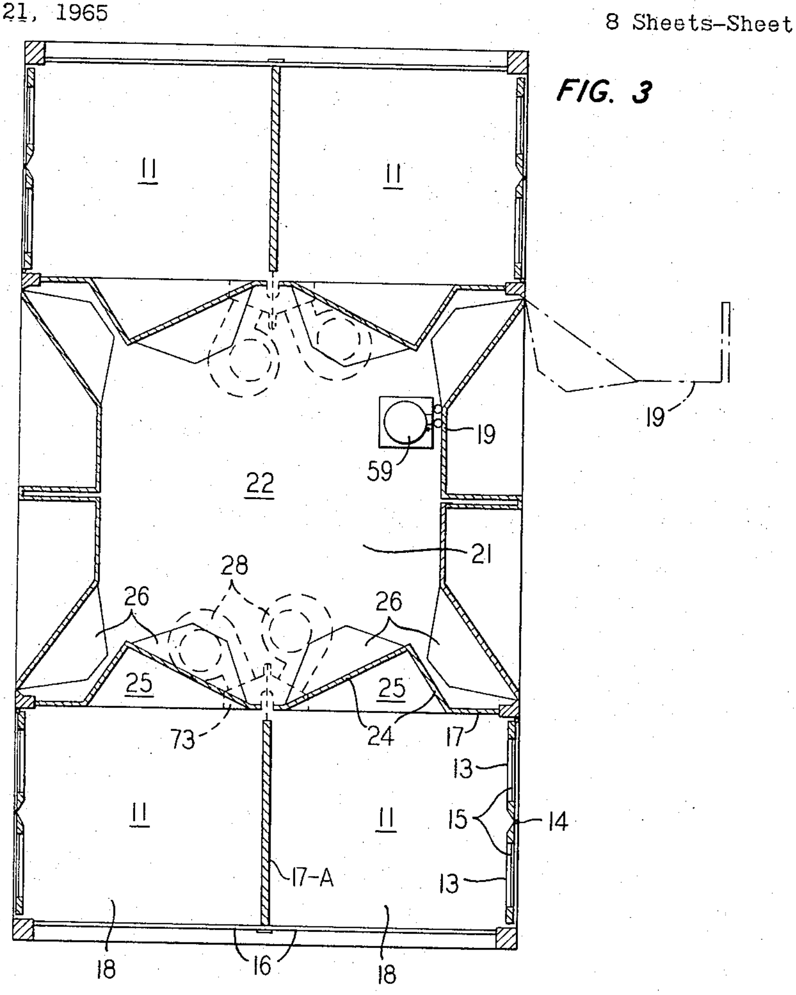
FIG. 3 is a top section view along A—A of FIG. 2.

Referring first to FIGS. 1, 2 and 3, the unit generally indicated as 10, consists essentially of two separate telephone booths 11 at each end of the unit and two separate telephoning recesses 12 on each side, between the end booths 11. While the inventive concept permits of numerous suitable and well-known structural means, it is preferable to employ welded aluminum frameworks for the walls, roof and base, which are bolted together to form the booths and shelves. The entrance to each booth 11 is from the unit's side by means of a full length panel door 13 that has an inwardly-folding vertical center hinge 14. Each door includes two safety glass panels 15. The booth walls 16 at the trailer ends are advantageously constructed of single full length safety glass panels. The interior booth panels 17 and 17A may be textured, perforated aluminum acoustically treated between adjacent booths and shelves. Each booth 11 has a floor 18 that may be advantageously of abrasive clad aluminum.

Figure 4:
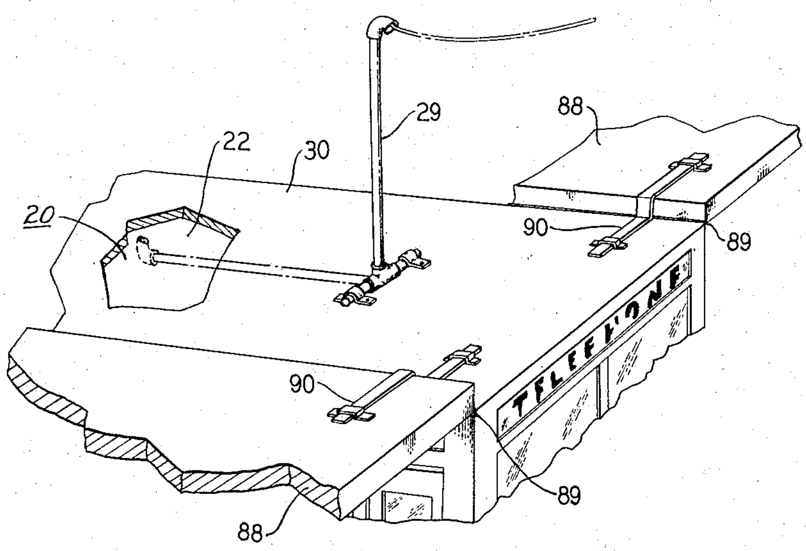
FIG. 4 is a partial perspective view of the unit's top.

As best shown in FIGS. 3 and 4, a central core or space 20 is formed inwardly of the several relatively accessible adjacent outer compartments formed of the booths 11 and recesses 12. Access to space 20 is gained by unlatching and opening out the hinged vertical paneling 19 which define each of the four telephoning recesses 12, as illustrated in FIG. 3. Space 20 is advantageously divided horizontally by a platform 21 into an upper portion or space 22 and a lower space 23. Upper space 22 is defined horizontally by platform 21 and roof 30; and vertically by the vertical paneling 19 and the vertical paneling 24 of the telephone recesses 25 in each booth 11.

Space 20 conveniently centralizes and protects much of the apparatus and equipment needed for the unit. Each telephone pay station 26 protrudes into space 20, exposing only its essentials, e.g., coin slots, handset and dial means (all generally designated 27), as shown in FIGS. 1 and 2. Equipment (not shown) includes a connecting panel to which the telephone and electrical wires which service each booth are brought; spare tire, tools, and—optionally—a generator and air conditioner. Also within space 23 are several blower motors 28 which operate a ventilating system, to be described.

The referred-to wires are led from the connecting panel (not shown) either to a service mast 29 located on roof 30; or to a floor connection 31 as in FIG. 1 for tie-in with an underground servicing outlet as would be desirable in most indoor applications.

The exposed portions of platform 21, as shown in FIGS. 1 and 3, serve as utility surfaces for each of the four telephoning recesses 12. Beneath each is a service shelf 32 in which to protectively store a telephone directory or the like, and which further is used as a fresh air inlet duct to feed the booth ventilation system. Means such as a fine wire mesh 32–A across the inner end of each shelf serves as a stop to help contain the directory and also helps filter the incoming air.

In accordance with the inventive concept, beneath platform 21 and shelves 32 is lower space 23 bounded vertically with the rear booth panels 17 and with removable side panels 33. Space 23 contains the retractable suspension system.

Figure 5:
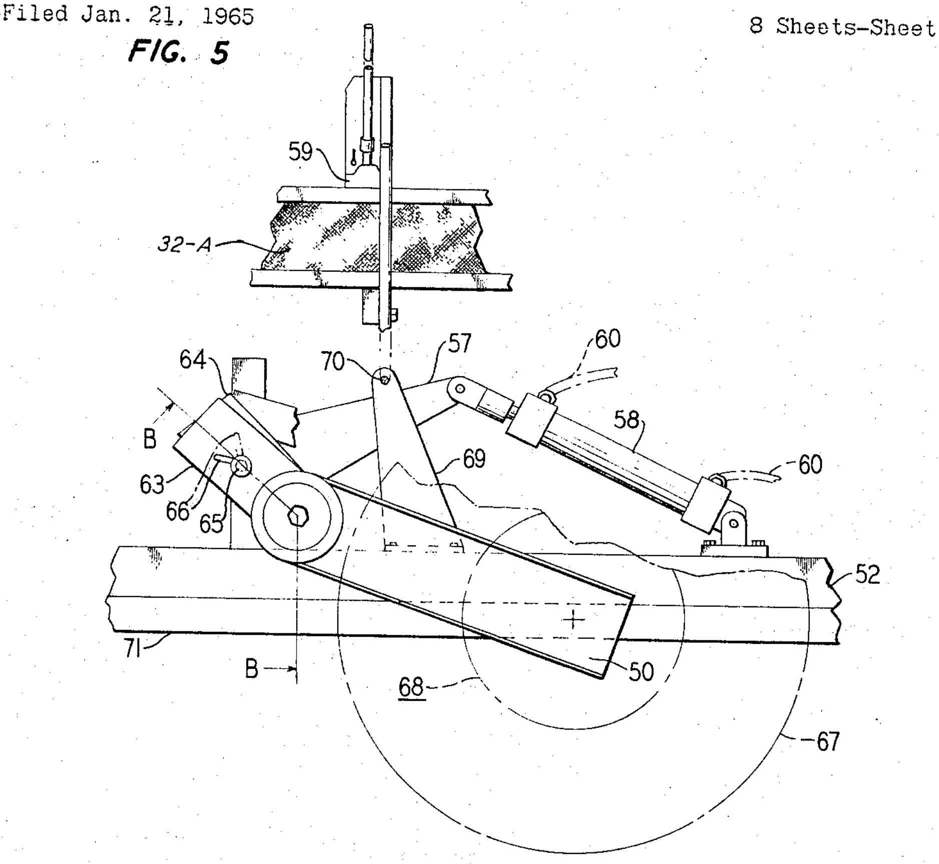
FIG. 5 is a schematic showing in side view the suspension.
Figure 6:
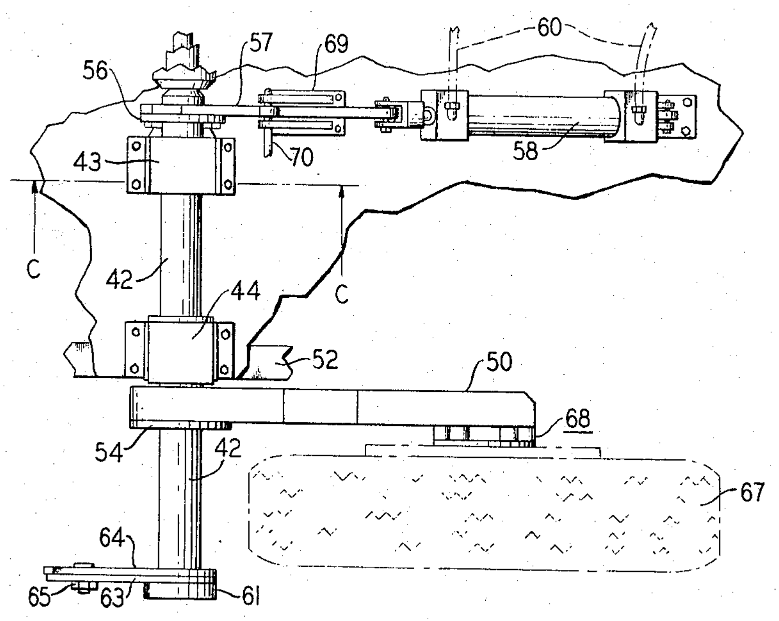
FIG. 6 is a schematic showing the suspension in partial top view.
Figure 7:
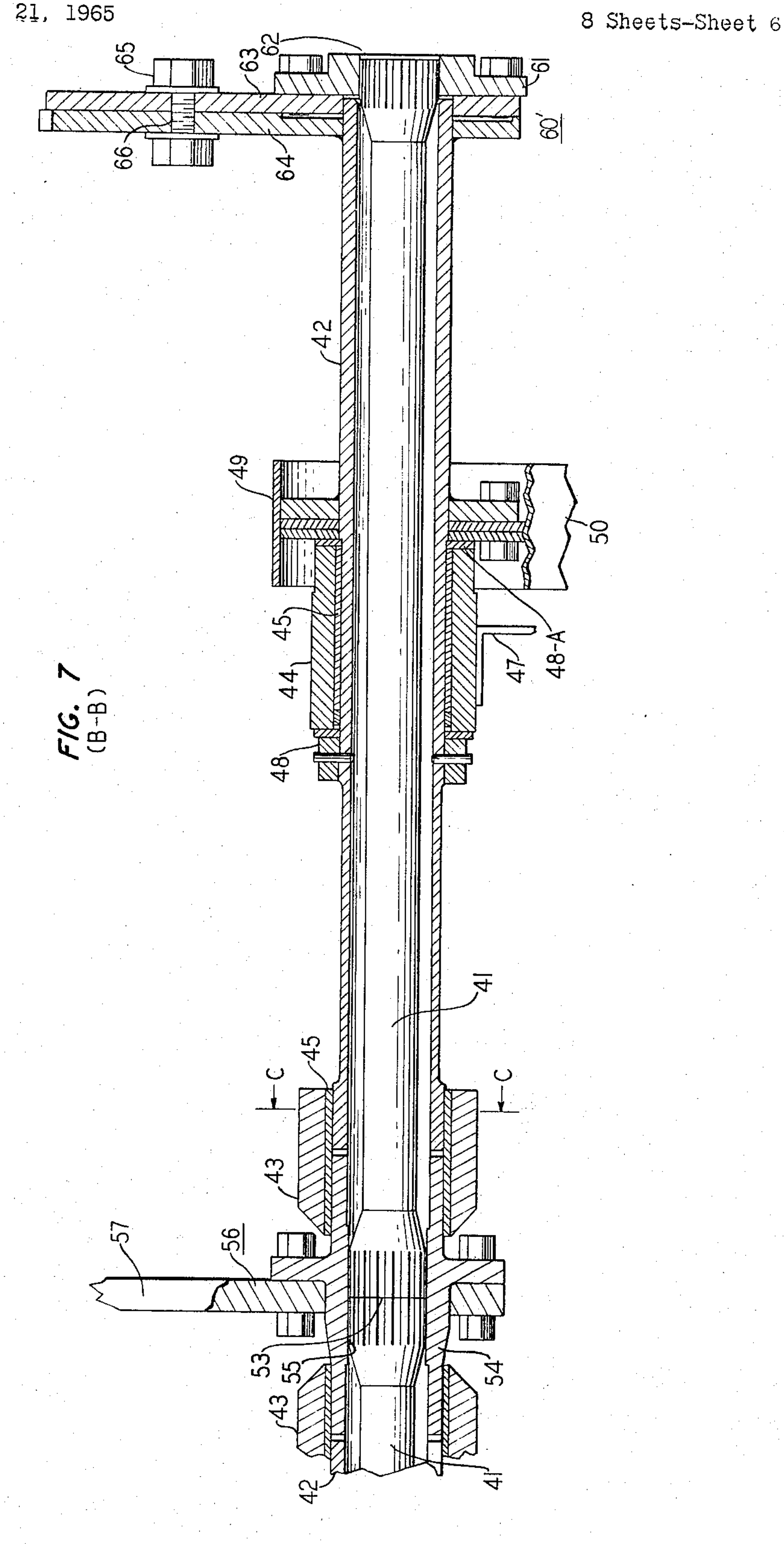
FIG. 7 is a sectional front partial view of the suspension taken at B—B of FIG. 5.

Referring to FIGS. 5, 6 and 7, this system essentially involves two separate torsion bars 41 each housed in its own torsion tube 42. Each torsion tube is individually maintained in inner and outer bearing housings 43 and 44. Each housing contains a bearing surface 45. Outer bearings 44 (only one shown as per FIGS. 6 and 7) are positioned by a thrust bearing assembly 48 at about the central portion of tube 42. Their housings 44 are secured in a convenient way as, for example, bolting, to a structural angle 72 (best seen in FIG. 9) which is attached to the main structural members such as 47, that form a part of the aforementioned welded aluminum framework. Welded to tube 42 is a flange assembly 49 to which suspension arm 50 is attached. A thrust bearing 48A is mounted between housing 44 and assembly 49. Inner bearings 43 (only one shown) are attached to the support angle 72 which is attached to main structural members 47 and 52, shown in FIG. 9.

As seen in FIG 7, torsion bars 41 abut each other in axial relation and are splined at their respective inner ends 53. A joining member 54 having a splined axial bore 55 receives the inner ends 53. The inner bearings 43 also accommodate for rotation member 54, so that if the latter is rotated, the bars 41 will undergo an equal rotation. A leverage assembly, shown generally as 56, is secured to member 54 and includes an arm 57 that may be actuated by, for example, hydraulic cylinder 58, also anchored to member 52. Cylinder 58 is operated by a hydraulic pump 59 and lines 60 (not all shown).

As seen in FIG. 7, the outermost ends of each tube 42 and each bar 41 are attached by an adjustable means designated generally as 60. This means consists of a disc 61 having a splined inner aperture 62 in which is secured the splined outer end of bar 41. An extension arm 63 is attached to disc 61 and faces another arm 64 which in turn is rigidly connected to tube 42. In FIG. 5, a pair of non-aligned V-shaped slots 66 in arms 63 and 64 are shown, through which a heavy duty nut and bolt assembly 65 is placed. By adjustment of the position of assembly 65 in slots 66, the arms 63, 64 may be pivoted in opposite directions to effect an adjustment of torsional force in bar 41 and tube 42.

In accordance with one aspect of the invention, the operation of the suspension and wheel retracting system is as follows. In FIG. 5, the wheels 67 and brake-axle assembly 68 attached to arm 50 are shown in the fully extended position for towing. A bracket such as 69 bolted to the frame member 52 holds arm 57 in place with a pin 70, inserted when a pair of bushed apertures (not shown) in bracket 69 and arm 57 line up. With arm 57 thus fixed, member 54 (FIG. 7) cannot rotate, and the inner ends of bars 41 therefore are also fixed. When a wheel 67 encounters an irregularity, arm 50 pivots up or down causing an elastic torsional distortion in tube 42 between assembly 49 and arm 64. This in turn torsionally flexes bar 41. If the irregularity were a bump, for example, arm 50 would pivot upwardly and the tube 42 and bar 41 would flex, supplying a torsional restoring force to pivot arm 50 downwardly. The resiliency supplied by bar 41 is augmented by tube 42 although no added vehicle width is necessary.

Figure 8:
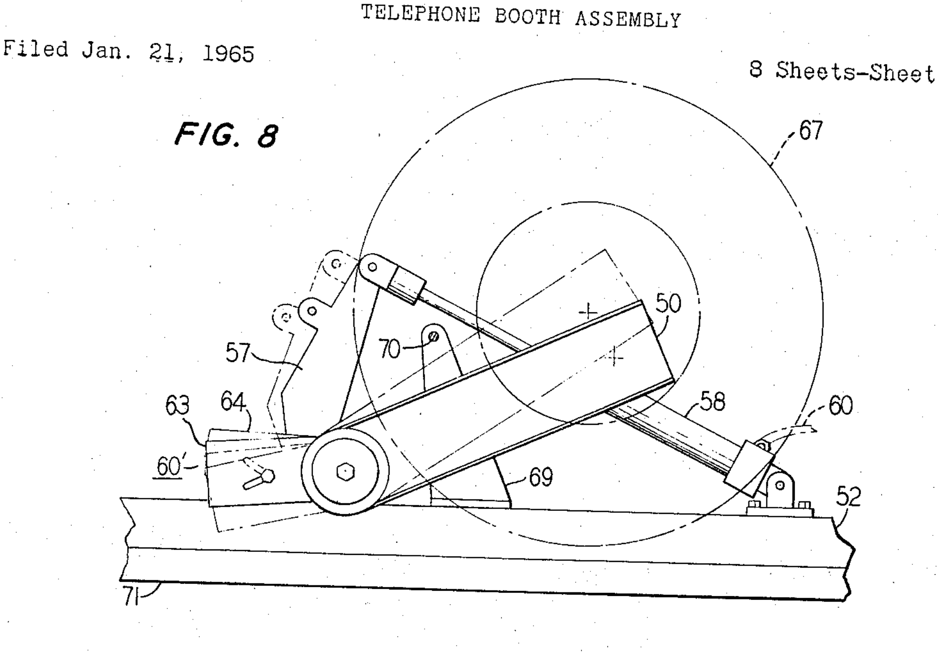
FIG. 8 is a schematic side view of the retracting mechanism.

The wheels 67 and arm 50 are retracted by operation of hydraulic member 58 which, when pin 70 is removed, rotates counter-clockwise as seen in FIGS. 5 and 8. Wheels 67 move to within lower space 23 until the under surface 71 of the unit 10 rests on the ground. Wheels 67 may be withdrawn from the ground by a slight further operation of the reversible hydraulic system, as is shown in phantom in FIG. 8, to facilitate tire changes. Cover 33 shown in FIG. 2, which is fastened to unit 10 by any convenient manner, is readily removed to gain access to the tires, the suspension system or other structure within lower space 23.

The torsion bar suspension feature of the invention, illustrated in an embodiment such as described is especially suitable for the mobile coin telephone unit. The suspension operates in its extended or retracted position within a very limited and confined space, yet is rugged and capable of providing a smooth ride over the rough roads on which such a unit frequently must be hauled.

Figure 10:
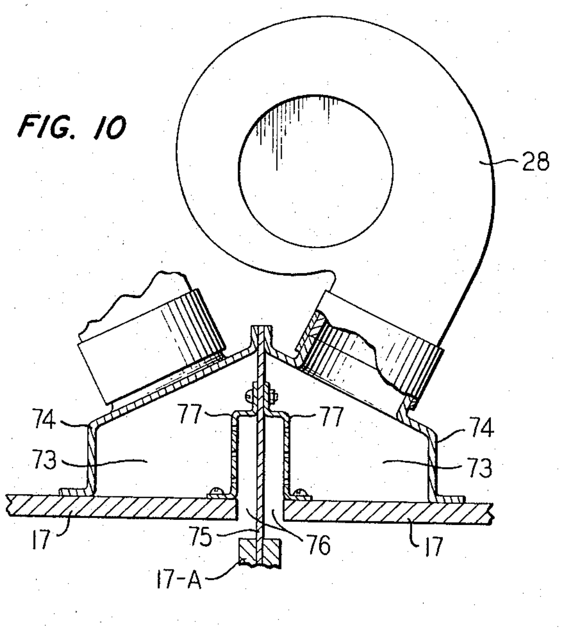
FIG. 10 is a schematic top view of a blower motor and ventilation outlet.
Figure 11:
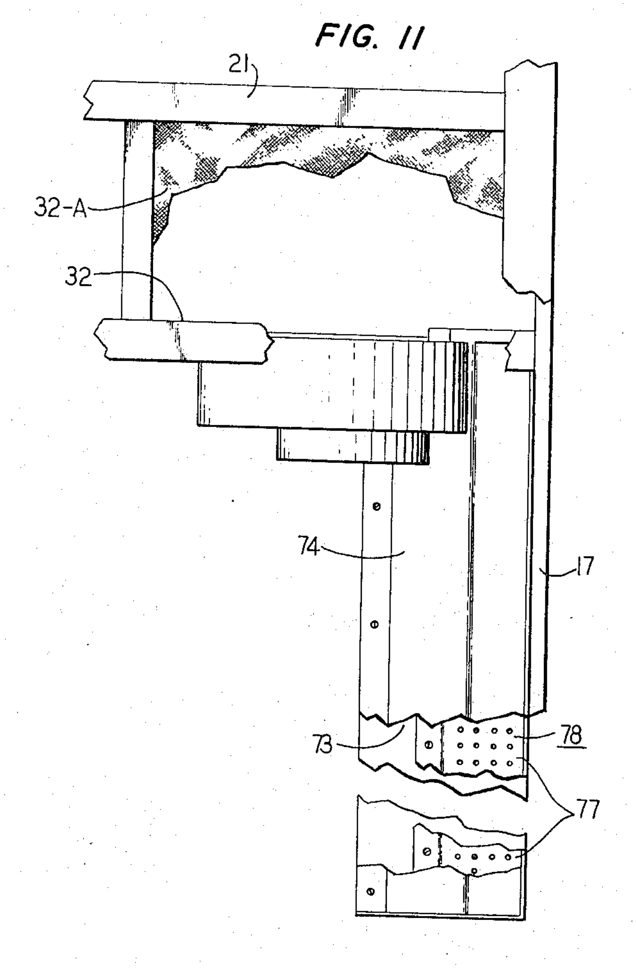
FIG. 11 is a front view showing in partial cutaway a vent outlet.

As noted, in accordance with another feature of the invention, each shelf 32 constitutes an air inlet for a ventilation system. As seen in FIG. 3 a blower 28 services each booth to ensure ventilation. Referring now to FIGS. 3, 10 and 11, each blower 28 is mounted beneath platform 21, feeding a vertical duct 73. Duct 73 extends from about floor level 71 to the level of shelf 32, within lower space 23, and is adjacent to the remote inner corner of each booth 11. Each duct 73 includes a plate 74 that fastens between the respective inner panel 17 and a mounting plate 75 of the adjacent panel 17A. As noted in FIG. 10, a space 76 separates panels 17 and 17A. A formed sheet 77 with perforations 78 completes duct 73. When a blower 28 is on, fresh air is drawn from the vicinity of a respective filter 33 (shown in FIG. 2) and is forced into duct 73, through the perforations 78 and space 76 into the respective booth 11. Procuring fresh air for booth ventilation from well above ground level through shelves 32 and screening 32A diminishes the amount of ground dust that might otherwise be present.

In FIG. 12, the front end of unit 10 is represented schematically and shows tow bar 79 extended from its housing which may be, for example, a hollow channel such as 52. When fully retracted as shown in FIG. 1, the hitch 80 to tow bar 79 is concealed by a hinged panel 81 that covers the entire recess 82. Within the latter are also located the ground level telephone and electrical connections 83 and 84. Wires for the brake and tail lights and the electric brakes, if desired, are led from the towing vehicle along the tow bar to unit 10, as in usual practice.

FIG. 12 shows a leveling jack mechanism 85, one of four located at the corners of the unit. Although various leveling systems are feasible, the preferred system is a simple screw type, hand-operated jack for each corner.

In FIG. 13, a panel 86, which ordinarily conceals a utility recess 87 across the bottom portion at the back end of unit 10, is opened up on a pair of hinges exposing brake and tail lights and the usual illuminated license plate.

Figure 14:
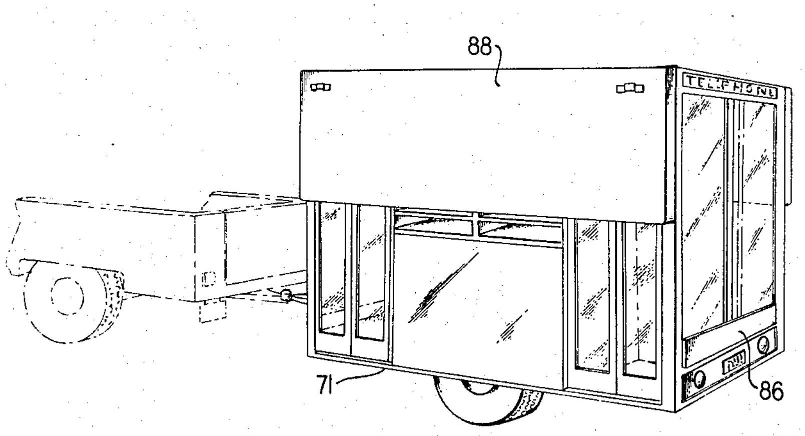
FIG. 14 is a perspective showing the unit being towed.

In FIGS. 1 and 2, a roof canopy 88 is hinged on either side of the unit. Each can be dropped at the unit's sides when the unit is to be moved, as in FIG. 14. When in place at an outdoor location, the canopies are horizontally disposed to provide shelter for customers using the outside telephone recesses 12 or entering the booths 11. In this position, each canopy 88 is pivotally supported on a suitable hinge 89 and held horizontal by, for example, a strap and latch mechanism 90. Each canopy may be locked in its folded position by a similar mechanism (not shown) to facilitate travel. In addition, a cover of canvas or the like may be fashioned to fit snugly over the entire structure to protect it during travel.

Persons skilled in the art may make changes in the arrangements described; and it is to be understood that the embodiments shown and described are merely illustrative of the principles of the invention and are not to be construed in a limiting sense.

What is claimed is:

1. A unitary mobile structure for portably housing a plurality of telephone coin stations comprising, in combination:

(a) a plurality of relatively accessible adjacent outer compartments each defining a separate telephoning area having a telephone coin station therein;
(b) an inner compartment spaced inwardly of said outer compartments;
(c) first means including a plurality of resiliently suspended wheels for rendering said structure mobile; and
(d) second means for selectively positioning said first means whereby said wheels may be lowered to support said structure for towing and may be retracted thereby to conceal said wheels and to lower said structure to ground level;
(e) said outer compartments comprising first and second pairs of adjacent telephone booths on opposite ends of said structure, and first and second pairs of adjacent telephoning recesses on opposite sides of said structure, each of said recesses being adjacent a respective one of said booths; and
(f) said inner compartment comprising an upper and a lower space, said upper space being inwardly of said telephone recess pairs and of said booth pairs, and said lower space being inwardly of said booth pairs and beneath said telephone recesses and said upper space.

2. Apparatus in accordance with claim 1 wherein said first means comprises:

(a) a pair of wheels;
(b) a pair of torsion-yieldable elongated tubes rotatably mounted in axial relation in said lower space;
(c) a torsion bar mounted within each said tube;
(d) means connecting the outer end of each said torsion bar with the respective outer end of the adjacent said tube;
(e) a suspension arm affixed to each siad tube at a central portion thereof for mounting a respective one of said wheels; and
(f) means connecting the opposed inner ends of said torsion bars and for holding said bars in a fixed position wherein each said wheel protrudes downwardly from said lower space for ground contact.

whereby when either wheel encounters a ground irregularity, the respective suspension arm pivots, thereby imparting torsional energy to the respective torsion bar and tube, said energy restoring said arm to its unpivoted position.

3. Apparatus in accordance with claim 2, wherein said last-named means is a rotatably mounted member, and said second means comprises means for rotating said member thereby to effect rotation of said torsion bars and of said torsion tubes, whereby said suspension arms are pivoted and said wheels are positioned with respect to said structure.

4. Apparatus in accordance with claim 3 wherein said second means further includes means for fixing said rotatably mounted member in any one of a plurality of rotational positions to secure said inner ends of each said torsion bar against rotation, thereby resiliently suspending each said wheel through the torsional responsiveness of each said torsion bar and the respective torsion tube to the pivotal movement of the respective suspension arm.

5. Apparatus in accordance with claim 4 further including means for radially positioning the outer end of each said torsion bar with the respective outer end of each said tube thereby to adjust the torsional energy stored in said torsion bar and tube when said wheel is in contact with the ground.

6. A unitary lightweight mobile compartmentalized structure for housing a plurality of telephone coin stations comprising, in combination:

(a) a plurality of relative accessible adjacent outer compartments each defining a separate telephoning area having a telephone coin station therein;
(b) an inner compartment spaced inwardly of said outer compartments;
(c) retractable towing means concealable in said inner compartment when said coin stations are being used, and extensible therefrom for towing said structure;
(d) means including a concealable service mast for procuring power and telephone line connections when said stations are in use, and for releasing said connections for removal of said structure to a new location.

7. Apparatus in accordance with claim 6 wherein said structure has a generally rectangular base, said outer compartments comprise first and second pairs of adjacent telephone booths on opposite ends of said structure, and first and second pairs of adjacent telephoning recesses on opposite sides of said structure, each of said recesses being adjacent to a respective one of said booths; and said inner compartment comprises an upper and a lower space, said upper space being inwardly of said telephone booth pairs and of said recesses, and said lower space being inwardly of said telephone booth pairs and beneath said telephone recesses and said upper space.

8. Apparatus in accordance with claim 7 wherein each said telephoning recess includes a horizontal surface therein and an enclosed shelf with open first and second ends under said surface, said first ends being disposed outwardly of said structure and said second ends opening onto said inner compartment; and said structure further includes means for drawing air in through each said enclosed shelf and for force ventilating each of said booths with said air.

9. Apparatus in accordance with claim 7 wherein each of said second ends of said shelves further include means for filtering the incoming air, said means further defining a stop at the second end of each said shelf thereby making said shelves usable additionally for storing a telephone directory.

10. Apparatus in accordance with claim 6 further including a recess located to normally face traffic behind said structure, said recess containing brake lights, license plate, directional signals and the like, and means for covering said recess when said structure is in use as a housing for telephone coin stations.

11. Apparatus in accordance with claim 6 further including a plurality of levelling means extending from the floor of said structure at the corners thereof whereby said structure may be placed in a relatively level posture regardless of ground irregularities.

12. Apparatus in accordance with claim 6 further including a pair of hinge-mounted canopies extending outwardly from the sides of said structure at substantially roof level, each said canopy being foldable to a vertical position flush with a respective side of said structure to facilitate the moving of said structure.

13. Apparatus in accordance with claim 12 further including a first means having a pair of resiliently suspended wheels for rendering said structure mobile, and a second means for selectively positioning said first means, whereby said wheels may be lowered to support said structure for towing and may be retracted to within said lower space of said structure thereby to conceal said wheels and to lower said structure to ground level.

14. A unitary structure for portably housing a plurality of telephone coin stations comprising, in combination:

(a) a plurality of structurally connected relatively accessible compartments adjacently spaced around a generally rectangular base, thereby defining a central volume inwardly of said compartments, each of said compartments having a coin station;
(b) a slidably mounted tow bar, said bar concealable within said inner volume, and extensible therefrom for towing said structure;
(c) a telephone and electrical line service mast, said mast extensible from said structure for procuring overhead electrical and telephone connections, and concealable when said overhead connections are not being used;
(d) a plurality of enclosed shelves, each said shelf having open first and second ends, said first end being disposed outwardly of said structure and said second ends opening onto said central volume;
(e) means for drawing air in through each said enclosed shelf for ventilating selected ones of said compartments;
(f) each of said second ends further including means for filtering the air and for defining a stop thereby to render said shelves usable for storing telephone directories;
(g) a concealable recess located to normally face traffic behind said structure, said recess containing brake lights, license plate, directional signals and the like;
(h) leveling means extending from the floor of said structure at the corners thereof for placing said structure in a relatively level posture regardless of ground irregularities;
(i) a pair of hinge-mounted canopies extending outwardly from the lengthwise sides of the structure at substantially roof level, each said canopy being pivotal to a vertical position flush with a respective side of said structure;
(j) first means having a pair of resiliently suspended wheels for rendering said structure mobile; and second means for selectively positioning said first means whereby said wheels may be lowered from within said central volume for towing and retracted to within said central volume for concealment.

15. Apparatus in accordance with claim 14 wherein said first means comprises:

(a) a pair of wheels;
(b) a pair of elongated torsion tubes rotatably mounted in axial relation in said central volume;
(c) a torsion bar mounted within each said tube;
(d) means connecting the outer end of each said torsion bar with the respective outer end of the associated said tube;
(e) a suspension arm affixed to each said tube inwardly of the ends thereof, said arm mounting a respective one of said wheels; and
(f) means connecting the inner ends of said torsion bars and for holding said bars in a fixed position wherein each said wheel protrudes downwardly from said central volume for ground contact, whereby when either wheel encounters a bump the respective suspension arm pivots, thereby imparting torsional energy to the respective torsion bar and of the tube, said energy restoring said arm to its unpivoted position.

16. Apparatus in accordance with claim 15 wherein said connecting means is rotatably mounted member; and said second means comprises means for rotating said member thereby to effect rotation of said torsion bars and of said torsion tubes whereby said suspension arms are pivoted and said wheels are positioned with respect to said structure.

17. Apparatus in accordance with claim 16 wherein said second means further includes means for fixing said rotatably mounted member in any one of a plurality of rotational positions to secure said inner ends of each said torsion bar against rotation, thereby resiliently suspending each said wheel, through the torsional responsiveness of each said torsion bar and the respective torsion tube to the pivotal movement of the respective suspension arm.

18. Apparatus in accordance with claim 17 further including means for radially positioning the outer end of each said torsion bar with the respective outer end of each said torsion tube thereby to adjust the torsional energy content thereof.

References Cited

UNITED STATES PATENTS

| | | | |
|---|---|---|---|
| 293,595 | 2/1884 | Ribot | 52—143 XR |
| 2,141,781 | 12/1938 | Allen | 280—1 |
| 2,769,211 | 11/1956 | Hewitt | 52—36 XR |
| 2,904,850 | 9/1959 | Couse et al. | 52—36 |
| 3,096,065 | 7/1963 | Horne | 248—354 |

FRANK L. ABBOTT, *Primary Examiner.*

R. S. VERMUT, *Assistant Exaiminer.*